US 11,757,736 B2

(12) United States Patent
Nadger et al.

(10) Patent No.: US 11,757,736 B2
(45) Date of Patent: Sep. 12, 2023

(54) PRESCRIPTIVE ANALYTICS FOR NETWORK SERVICES

(71) Applicant: VMWARE, INC., Palo Alto, CA (US)

(72) Inventors: Girish Nadger, Palo Alto, CA (US);
Somenath Pal, Bangalore (IN);
Somaresh Sahu, Bangalore (IN);
Manohara Eshwarappa, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/215,009

(22) Filed: Mar. 29, 2021

(65) Prior Publication Data

US 2022/0224611 A1    Jul. 14, 2022

(30) Foreign Application Priority Data

Jan. 8, 2021  (IN) ............................ 202141000920

(51) Int. Cl.
| G06F 15/173 | (2006.01) |
| H04L 43/022 | (2022.01) |
| G06N 20/00 | (2019.01) |
| H04L 43/16 | (2022.01) |
| H04L 43/045 | (2022.01) |

(52) U.S. Cl.
CPC .......... H04L 43/022 (2013.01); G06N 20/00 (2019.01); H04L 43/045 (2013.01); H04L 43/16 (2013.01)

(58) Field of Classification Search
CPC ..... H04L 43/022; H04L 43/16; H04L 43/045; G06N 20/00

USPC ....... 709/224, 223; 726/22, 23; 717/11, 168, 717/170, 171, 174
See application file for complete search history.

(56) References Cited

U.S. PATENT DOCUMENTS

| 10,673,886 | B1* | 6/2020 | Mezic ..................... H04L 41/22 |
| 2001/0052121 | A1* | 12/2001 | Masuda ................... G06F 8/60 717/170 |
| 2009/0144823 | A1* | 6/2009 | Lamastra .............. H04L 51/212 726/22 |
| 2012/0324437 | A1* | 12/2012 | Sakaguchi ............. G06F 21/31 717/170 |
| 2013/0051248 | A1* | 2/2013 | Pei ..................... H04L 41/0618 370/245 |

(Continued)

*Primary Examiner* — Thuong Nguyen
(74) *Attorney, Agent, or Firm* — Patterson + Sheridan, LLP

(57) ABSTRACT

The disclosure provides an approach for prescriptive analytics for network services. Embodiments include receiving one or more rules for anomaly detection. Embodiments include receiving metric data of one or more services and collecting context data related to the metric data. Embodiments include determining a baseline for the metric data. Embodiments include detecting an anomaly based on analysis of the metric data in view of the baseline for the metric data and the one or more rules for anomaly detection. Embodiments include associating the anomaly with a subset of the context data that is related to the anomaly. Embodiments include determining a score for the anomaly based on the analysis and determining that a notification should be generated based on the score. Embodiments include providing the notification to a user interface for display. The notification comprises includes an indication of the anomaly and the subset of the context data.

18 Claims, 5 Drawing Sheets

(56) References Cited

U.S. PATENT DOCUMENTS

| | | | |
|---|---|---|---|
| 2013/0067449 A1* | 3/2013 | Sannidhanam | G06F 8/60 |
| | | | 717/170 |
| 2013/0086243 A1* | 4/2013 | Cho | H04L 12/282 |
| | | | 709/223 |
| 2014/0181968 A1* | 6/2014 | Ge | H04L 63/1425 |
| | | | 726/23 |
| 2014/0189435 A1* | 7/2014 | Manuel-Devadoss | |
| | | | H04L 43/10 |
| | | | 714/43 |
| 2015/0029333 A1* | 1/2015 | Ko | H04N 7/181 |
| | | | 348/143 |
| 2015/0199254 A1* | 7/2015 | Vesepogu | G06F 11/3466 |
| | | | 717/130 |
| 2016/0261482 A1* | 9/2016 | Mixer | H04L 63/00 |
| 2016/0359592 A1* | 12/2016 | Kulshreshtha | H04L 45/74 |
| 2017/0104658 A1* | 4/2017 | Sykes | H04L 41/064 |
| 2018/0020015 A1* | 1/2018 | Munro | G06F 21/552 |
| 2018/0255100 A1* | 9/2018 | Degioanni | H04L 63/1425 |
| 2020/0228558 A1* | 7/2020 | Apostolopoulos | |
| | | | G06F 16/9024 |
| 2020/0267057 A1* | 8/2020 | Garvey | H04L 41/0816 |
| 2021/0004704 A1* | 1/2021 | Dang | G06F 11/3452 |
| 2021/0390027 A1* | 12/2021 | Ohana | G06F 11/3055 |
| 2022/0011736 A1* | 1/2022 | Ishimura | G06Q 10/06312 |

* cited by examiner

PRESCRIPTIVE ANALYTICS FOR NETWORK SERVICES

RELATED APPLICATIONS

Benefit is claimed under 35 U.S.C. 119(a)-(d) to Foreign Application Serial No. 202141000920 filed in India entitled "PRESCRIPTIVE ANALYTICS FOR NETWORK SERVICES", on Jan. 8, 2021, by VMware, Inc., which is herein incorporated in its entirety by reference for all purposes.

BACKGROUND

Services running in a network generate large amounts of data, such as logs and alerts. This data may be analyzed, such as by administrators, for a variety of purposes, such as to monitor the health of services, track resource usage, identify sources of problems, and the like. However, due to the large volume of data that may be generated, it can be difficult to identify significant and relevant information.

In some cases, notifications may be generated to indicate potential issues or noteworthy events in the network. For example, various techniques may be employed to detect anomalies in metrics collected from services, and notifications of anomalies may be provided to a user, such as an administrator. However, existing anomaly detection techniques are generally not efficient or cost-effective, and do not scale well in highly dynamic network environments, especially those involving multiple tenants.

Accordingly, there is a need in the art for improved techniques for detecting and reporting anomalies in a network.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
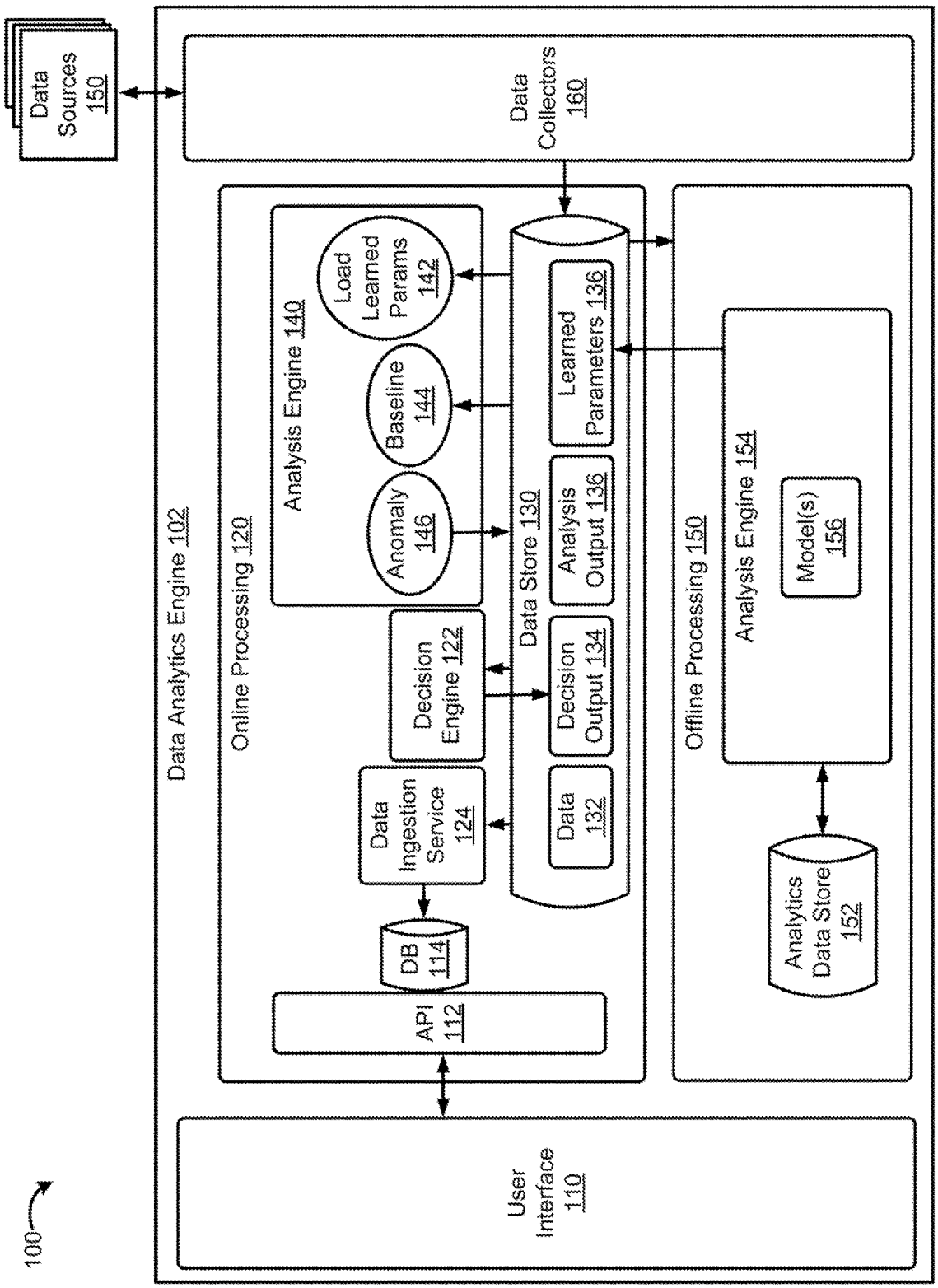
FIG. 1 depicts example components related to prescriptive analytics for network services.

The present disclosure provides an approach for prescriptive analytics for network services. In particular, embodiments include techniques for anomaly detection and reporting with associated context data.

Techniques described herein involve collecting data from various sources in a network, including various performance metrics, event data, alerts, and the like. Sources of data may include, for example, services, logs, metric monitoring components, and other data analysis components. Furthermore, context data may be retrieved in association with metrics, such as topology information (e.g., indicating connections and hierarchical relationships between services and devices in the network) and other metadata (e.g., indicating attributes of services and devices, such as software versions, capabilities, and the like).

Data may be analyzed to identify anomalies. In some embodiments, anomaly detection involves determining a baseline for one or more metrics and then comparing given values for those metrics (e.g., captured in real-time or near real-time) to the baseline in order to determine whether the given values are anomalous. A baseline may represent a "normal" state for one or more metrics based on an analysis of the metrics over a period of time. In some embodiments, an upper bound and/or lower bound may be determined, and data points that fall outside the upper and/or lower bound may be identified as anomalies.

Some embodiments involve analyzing data "offline" (e.g., not in real-time or near real-time, such as after a given amount of data has been captured or at regular intervals) to determine rules for anomaly detection. Offline data analysis may allow for a larger amount of historical data to be processed, as the analysis is less time-sensitive when not performed in real-time. In other embodiments, anomaly detection is performed only using "online" data analysis, such as by analyzing a first set of real-time data to determine a baseline and then comparing a second set of real-time data to the baseline to detect an anomaly. In certain embodiments, anomaly detection is performed based on both offline and online analysis, such as by using both anomaly detection rules determined through offline data analysis and baseline data determined through online data analysis to detect anomalies.

Once an anomaly is detected, a determination may be made of whether to generate a notification related to the anomaly. For example, a severity of the anomaly may be determined based on an anomaly score indicating an extent to which the anomalous data point(s) deviate from the baseline, and notifications may be generated for anomalies of a certain severity. In some embodiments, context data associated with an anomaly is included with a notification of the anomaly. For example, topological information and/or other metadata related to the anomaly may be included with the notification, which may be provided via a user interface. In some embodiments, related notifications are displayed together within the user interface. Notifications may be determined to be related if, for example, the notifications relate to alerts from services or devices that are related to one another (e.g., that are directly connected to one another topologically). Including context data as well as displaying related notifications together may allow for improved analysis of anomalies and more efficient identification of sources of problems. As such, techniques described herein improve computer functionality and network security by allowing performance and security issues to be understood and addressed more effectively.

FIG. 1 is an illustration 100 of example components related to prescriptive analytics for network services.

Data analytics engine 102 generally represents a service, running on one or more computing devices, that performs data collection and analysis with respect to one or more data sources 150 running in a networking environment, such as a physical or virtual networking environment. In one example, as described in more detail below with respect to FIG. 2, data analytics engine 102 runs on one or more virtual machines in a software defined network and data sources 150 correspond to services and/or physical/virtual devices in the software defined network.

Data analytics engine 102 comprises one or more data collectors 160 that collect metrics and associated context data from data sources 150. Data collectors 160 may, for example, connect to data flows, collect requests and responses (e.g., representation state transfer (REST) requests and responses) between components, simple network management protocol (SNMP) data, logs, alerts, performance metrics, topology information, metadata, and/or the like. In some embodiments, data collectors 160 connect certain data sources via a gateway component that provides connectivity to external components such as separate data analysis and/or context-providing services.

Data 132 collected by data collectors 160 is stored in data store 130, which generally represents a data storage entity such as a database or repository. Data store 130 stores various types of data related to online processing 120 by data analytics engine 102. Furthermore, various types of data stored in data store 130 may also be accessed for offline processing 150 by data analytics engine 102, and may also be stored in an analytics data store 152, which stores data related to offline processing 150.

Offline processing 150 includes an analysis engine 154 that analyzes data stored in analytics data store 152 in order to determine learned parameters 136, which may comprise rules for anomaly detection learned through analysis of historical metric data. Analysis engine 154 comprises one or more models 156 that are trained based on the historical metric data, such as using machine learning techniques. Models 156 are trained to output anomaly detection rules (e.g., upper and/or lower bounds) based on input data points, such as a series of values for a given metric that are indicative of a normal state for the metric.

Machine learning techniques may involve using a set of training inputs and training outputs to build a model that will output a value in response to inputs. Inputs may be described as "features". For example, each training data instance may include training data inputs or features (e.g., attributes, such as data types, of log queries and/or alerts visualized in historical widgets) associated with a training data output or label (e.g., an indication of the type of widget that was historically used to visualize the log queries and/or alerts). A plurality of training data instances is used to train the model, such as by constructing a model that represents relationships between features and output values. In some embodiments, training involves providing training data inputs to the model and iteratively adjusting parameters of the model until the outputs from the model in response to the training data inputs match (or fall within a certain range of) the training data outputs associated with the training data inputs, or until some condition is met, such as when a certain number of iterations have been completed without significant improvements in accuracy.

In other embodiments, unsupervised learning techniques may be used, such as principal component or cluster analysis. Principal component analysis involves maximizing variance using a covariance matrix. Cluster analysis involves grouping or segmenting datasets with shared attributes in order to extrapolate algorithmic relationships. Unsupervised learning techniques generally involve learning a new feature space that captures the characteristics of an original space by maximizing an objective function and/or minimizing a loss function.

For example, models 156 may be trained based on a data set including various historical metrics, and may model relationships among data points in the historical metrics. Trained models may be subjected to testing. Testing generally involves providing data points from a test dataset as inputs to the model, receiving labels as outputs, and verifying that the output labels match test labels. In some embodiments, a training data set is split into training data and test data for use in the separate training and testing stages.

Various types of machine learning models known in the art may be utilized with embodiments of the present disclosure, such as a neural network, a decision tree, a random forest, a long short term memory (LSTM) model, a gradient boosting machine, a linear regression model, a Multivariate Gaussian normal distribution model, or the like.

Once trained, models 156 may process historical metric data to generate learned parameters 136, which are stored in data store 130 for use in online processing 120. Learned parameters 136 may include, for example, upper bounds and/or lower bounds that indicate normal states of various metrics. In other embodiments, learned parameters 136 may include conditions known to indicate anomalies, such as metric values known to be anomalous based on historical anomalies.

Online processing 120 includes an analysis engine 140 that determines a baseline 144 based on data 132 (e.g., based on analyzing a first subset of data 132), and compares given data points within data 132 (e.g., data points subsequent to those used to determine baseline 144) to baseline 144 to determine an anomaly 146. A baseline may, for example, be determined using mean, variance, or other types of statistical analysis. Generally, baseline 144 is a snapshot of characteristics of data for a time interval, indicating a normal state of the data during the time interval. Online determination of a baseline is preferable when a baseline needs to be determined on a shorter interval (e.g., hourly or weekly) for collected data and when significant variation in the data is not expected between intervals. Online determination of a baseline is also preferable when a networking environment does not allow storage of large amounts of data for learning characteristics of the data.

In some embodiments, mean and variance of data at a time interval $t_n$ can be determined from the mean and variance of data at $t_{n-1}$ along with the current value in the following way.

$$M_{t_0}=x_{t_0}, M_t=M_{(t-1)}+(x_t-M_{(t-1)})/k$$

$$S_{t_0}=0, S_t=S_{(t-1)}+(x_t-M_{(t-1)})*(x_t-M_t)$$

Where
$M_{t_0}$=Mean at t0 Mt=Mean at time t,
k=number of data point until t
$s_{t_0}$ is variance at t0 St=variance at t $$\text{Standard deviation } \sigma = \sqrt{\frac{S_t}{(k-1)}}$$

Mean and variance can be used to calculate an upper bound (UB) and lower bound (LB) of the data for a given time interval in the following way.

Upper bound (*UB*)=Mean+*r*\*standard deviation

Lower bound (*LB*)=Mean−*r*\*standard deviation

Where r is a numerical value determined based on the variation of data. If data variation expected in a subsequent interval is higher than the previous interval, then the value of r would be high. In some embodiments, r is set to a default value such as 2.

Along with UB and LB, an effective upper bound (EUB) and effective lower bound (ELB) may be calculated in the following way.

Effective upper bound $(EUB)=\text{Max}(w1*UB, w2*M)$

Effective lower bound $(ELB)=\text{Min}(w1*UB, w2*m)$

Where w1 is the weight of UB required to be considered, M is the maximum value observed in the specified time interval, w2 is the weight of LB required to be considered, and m is the minimum value of the data points in specified time interval.

In an example, a data set is defined as follows: {4.59850959, 4.65099335, 4.97500345, 4.74837804, 5.03045661, 5.34497653, 4.85877175, 5.24066844, 4.85923747, 5.12279833}. The mean of the data set is 4.942979356 and the standard deviation (sigma) of the data set is 0.23390633564891022. In the example, r=2, w1=0.89, w2=0.11, max=5.344976533434836, and min=4.598509594720488. As such, UB=5.4107+2*0.233=5.41 and LB=5.4107−2*0.233=4.47. EUB and ELB are calculated as follows.

$EUB=\text{Maximum of }([w1*ub, w2*\max])=4.815$ $ELB=\text{Minimum of }([w1*lb, w2*\min])=0.5058$ In some embodiments, analysis engine 140 may also load learned parameters 136 from data store 130 that were generated from offline processing 150 as learned parameters 142. Analysis engine 140 may use the learned parameters in addition to or instead of baseline 144 to determine an anomaly 146 based on given data points from data 132. Learned parameters 136 may be determined in a similar way to that described above with respect to baseline 144, just using a larger data set. An anomaly 146 may be a data point from data 132 that falls outside of a normal range indicated by baseline 144 and/or the learned parameters loaded at 142 (e.g., above EUB or below ELB).

In certain embodiments, a baseline 144 is determined at the end of each specified interval and the latest baseline 144 is used for detection of an anomaly.

Continuing the example above, if two subsequent data points are V1=5.7 and V2=0.211, then V1 is determined to be an anomaly because it is larger than the EUB of 4.815, and V2 is also an anomaly because it is less than the ELB of 0.5058.

Analysis engine 140 produces analysis output 136, which may comprise data describing anomalies associated with context data from data 132 related to the anomalies. In one example, analysis output 136 indicates an anomalous value, one or more anomaly detection rules and/or baseline values used to detect the anomaly, an anomaly score (e.g., indicative of the extent to which the anomalous value departs from an expected range), information about the type of metric to which the anomaly pertains, context data associated with the anomaly, and/or the like. An anomaly score $S_p$ for an anomalous data point p may be calculated as follows: $S_p \propto \text{distance}(V_p, B)$, where $V_p$ is the effective value of the data point, B is the baseline value which was compared against $V_p$, and distance is the function that measures the dissimilarities between $V_p$ and B. The effective value $V_p$ may be determined as follows:

$V_p = D_p + \delta_{(D_p, max)}$ if $D_p > EUB$ $D_p - \delta_{(D_p, min)}$ if $D_p < ELB$ Where $D_p$=the current value of data point p, $\delta_{(D_p, max)}$=absolute value of $((D_p-\max)/\max)$, and $\delta_{(D_p, min)}$=absolute value of $((D_p-\min)/\min)$.

Dissimilarity can be measured in the following way. If data points follow a normal distribution then the probability (P1) of a data point D1 will be less than probability P2 of a data point D2 when the distance between the mean of the distribution (M) and D is more than M and D2.

P1<P2 if D1−M>D2−M, where P1 is the probability of data point D1, P2 is the probability of data point D2, and M is the mean of the distribution.

In an embodiment, D1 is less likely in the system than D2. So, if D1 and D2 are both anomalies, then the anomaly score of D1 should be higher than the anomaly score of D2. Score ($S_p$)=complement of probability density of current value.

In an example, the anomaly scores of V1 and V2 can be calculated as follows $V1=4.98$ $V2=0.31$ $\max=5.344976533434836$ $\min=4.598509594720488$ Effective value of $V1$ (effective_$v1$)=$V1$+absolute value of $(V1-\max)/\max)$ since $V1$>effective upper bound $(EUB)$ Effective value of $V2$ (effective_$v2$)=$V2$−absolute value of $(V2-\min)/\min)$ since $V2$<effective lower bound $(ELB)$ effective_$v1$=4.98+absolute vale of $((4.98-5.344)/5.344)$=5.0482 effective $v2$=0.31 absolute value of $((0.31-4.59)/4.59)$=−0.622 probability density of $V1$ $(P1)$=1.5411916071482197 probability density of $V2$ $(P2)$ =1.9635625864395068$e$−123

Anomaly score of $V1$ $(S1)$=absolute value of $(1-1.5411)*100$=54.11

Anomaly score of $V2$ $(S2)$=absolute value of $(1-8.231524480356946e-119)*100$=100

Thus, since data point V2 is rarer than V1, the anomaly score S2 of V2 is higher than the anomaly score S1 of V1.

Decision engine 122 performs operations related to taking action based on anomalies, such as generating notifications of anomalies. In some embodiments, decision engine 122 reviews analysis output 136 to determine whether a given anomaly warrants a notification. For example, an anomaly score associated with an anomaly may be compared with a threshold, and a notification may be generated if the anomaly score exceeds the threshold. Decision engine 122 may include context data related to an anomaly in a notification of the anomaly, which may be stored as decision output 134 in data store 130. In other embodiments, decision output 134 only indicates a decision (e.g., to notify or not to notify) for a given anomaly.

Data ingestion service 124 retrieves data from data store, such as decision output 134 and/or analysis output 136, and stores the data in a database 114 from which it is provided to a user interface 110 via an application programming interface (API) 112. For example, user interface 110 may be a management interface for data analytics engine 102, and may provide a user with information about metrics in a network. In some embodiments, user interface 110 receives notifications related to anomalies based on decision output 134 and/or analysis output 136 via calls to API 112. An example of user interface 110 is described below with respect to FIG. 5. For example, user interface 110 may display topological representations of network components along with notifications of anomalies related to the components, grouping related anomalies together. The user may be allowed to view context data related to notifications in order to assist in identifying sources of anomalies.

It is noted that the components and formulas described with respect to FIG. 1 are included as examples, and techniques described herein may be performed by fewer or more components using different formulas without departing from the scope of the present disclosure.

Figure 2:
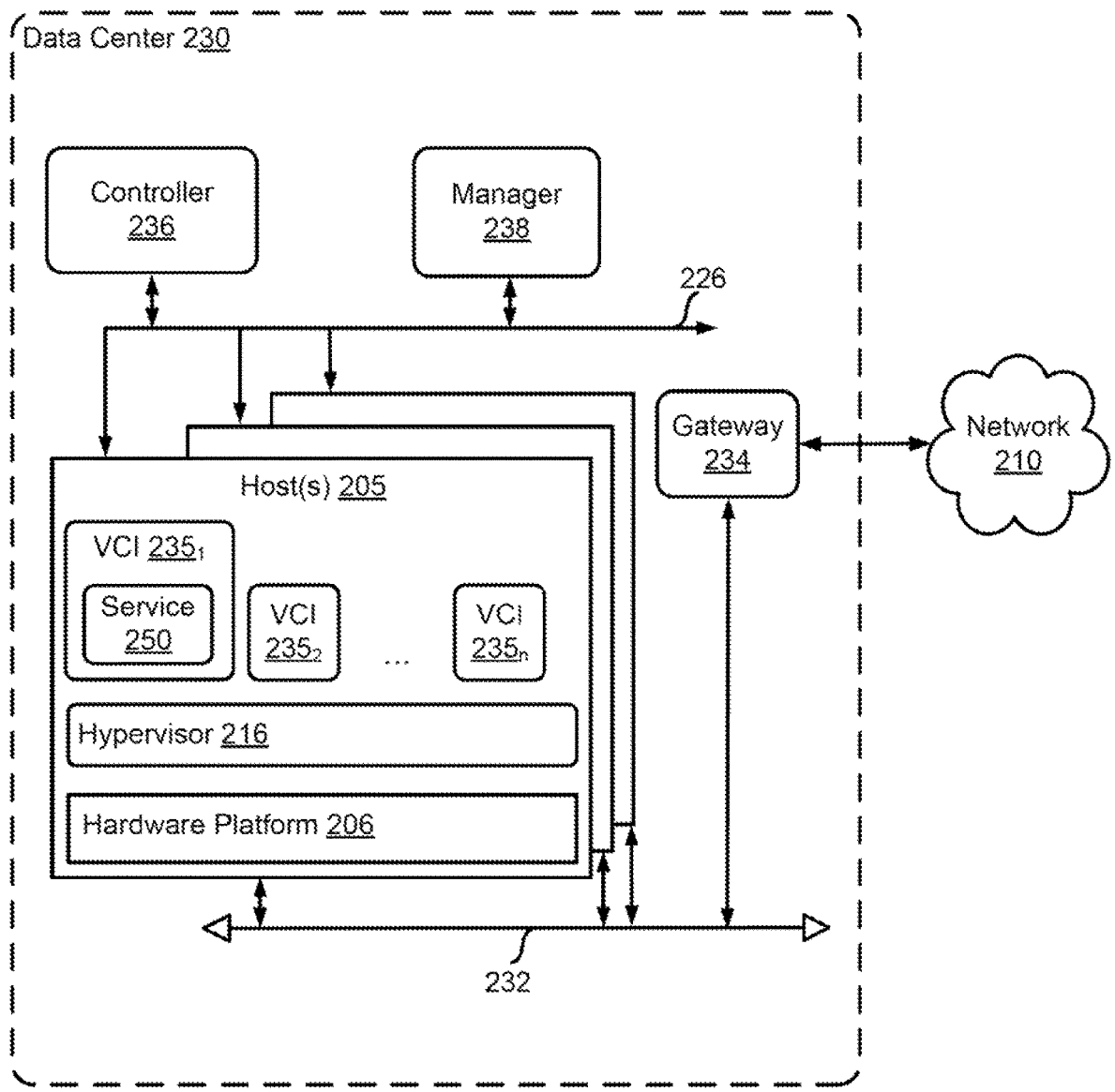
FIG. 2 depicts example physical and virtual network components with which embodiments of the present disclosure may be implemented.

FIG. 2 depicts example physical and virtual network components with which embodiments of the present disclosure may be implemented Networking environment 200 includes a data center 230 connected to network 210. Network 210 is generally representative of a network of computing entities such as a local area network ("LAN") or a wide area network ("WAN"), a network of networks, such as the Internet, or any connection over which data may be transmitted.

Data center 230 generally represents a set of networked computing entities, and may comprise a logical overlay network. Data center 230 includes host(s) 205, a gateway 234, a data network 232, which may be a Layer 3 network, and a management network 226. Data network 232 and management network 226 may be separate physical networks or different virtual local area networks (VLANs) on the same physical network.

Each of hosts 205 may be constructed on a server grade hardware platform 206, such as an x86 architecture platform. For example, hosts 205 may be geographically co-located servers on the same rack or on different racks. Host 205 is configured to provide a virtualization layer, also referred to as a hypervisor 216, that abstracts processor, memory, storage, and networking resources of hardware platform 106 into multiple virtual computing instances (VCIs) $235_1$ to $235_n$ (collectively referred to as VCIs 235 and individually referred to as VCI 235) that run concurrently on the same host. VCIs 235 may include, for instance, VMs, containers, virtual appliances, and/or the like. VCI $235_1$ comprises a service 150, which generally represents one of services 150 of FIG. 1. For example, services 150 of FIG. 1 may run on one or more VCIs on hosts 205.

Hypervisor 216 may run in conjunction with an operating system (not shown) in host 205. In some embodiments, hypervisor 216 can be installed as system level software directly on hardware platform 206 of host 205 (often referred to as "bare metal" installation) and be conceptually interposed between the physical hardware and the guest operating systems executing in the virtual machines. In certain aspects, hypervisor 216 implements one or more logical entities, such as logical switches, routers, etc. as one or more virtual entities such as virtual switches, routers, etc. In some implementations, hypervisor 216 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 235 may be replaced with containers that run on host 205 without the use of a hypervisor. Further, though certain aspects are described with respect to VCIs, such aspects may similarly apply to physical computing devices. For example, services 150 may run on a physical server.

Gateway 234 provides VCIs 235 and other components in data center 230 with connectivity to network 210, and is used to communicate with destinations external to data center 230 (not shown). Gateway 234 may be implemented as one or more VCIs, physical devices, and/or software modules running within one or more hosts 205.

Controller 236 generally represents a control plane that manages configuration of VCIs 235 within data center 230. Controller 236 may be a computer program that resides and executes in a central server in data center 230 or, alternatively, controller 236 may run as a virtual appliance (e.g., a VM) in one of hosts 205. Although shown as a single unit, it should be understood that controller 236 may be implemented as a distributed or clustered system. That is, controller 236 may include multiple servers or virtual computing instances that implement controller functions. Controller 236 is associated with one or more virtual and/or physical CPUs (not shown). Processor(s) resources allotted or assigned to controller 236 may be unique to controller 236, or may be shared with other components of data center 230. Controller 236 communicates with hosts 205 via management network 226.

Manager 238 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 238 is a computer program that executes in a central server in networking environment 200, or alternatively, manager 238 may run in a VM, e.g. in one of hosts 205. Manager 238 is configured to receive inputs from an administrator or other entity, e.g., via a web interface or API, and carry out administrative tasks for data center 230, including centralized network management and providing an aggregated system view for a user.

In an embodiment, data analytics engine 102 of FIG. 1 runs in data center 230. For example, data analytics engine 102 of FIG. 1 may be distributed across hosts 205, such as in the form of a plurality of services (e.g., service 250) running within VCIs (e.g., VCI $235_1$). In one embodiment, different components of data analytics engine 102 of FIG. 1 run as microservices within containers on VCIs 235. Data sources 150 of FIG. 1 may also correspond to components of data center 230, such as services, VCIs, manager 238, and the like.

Figure 3:
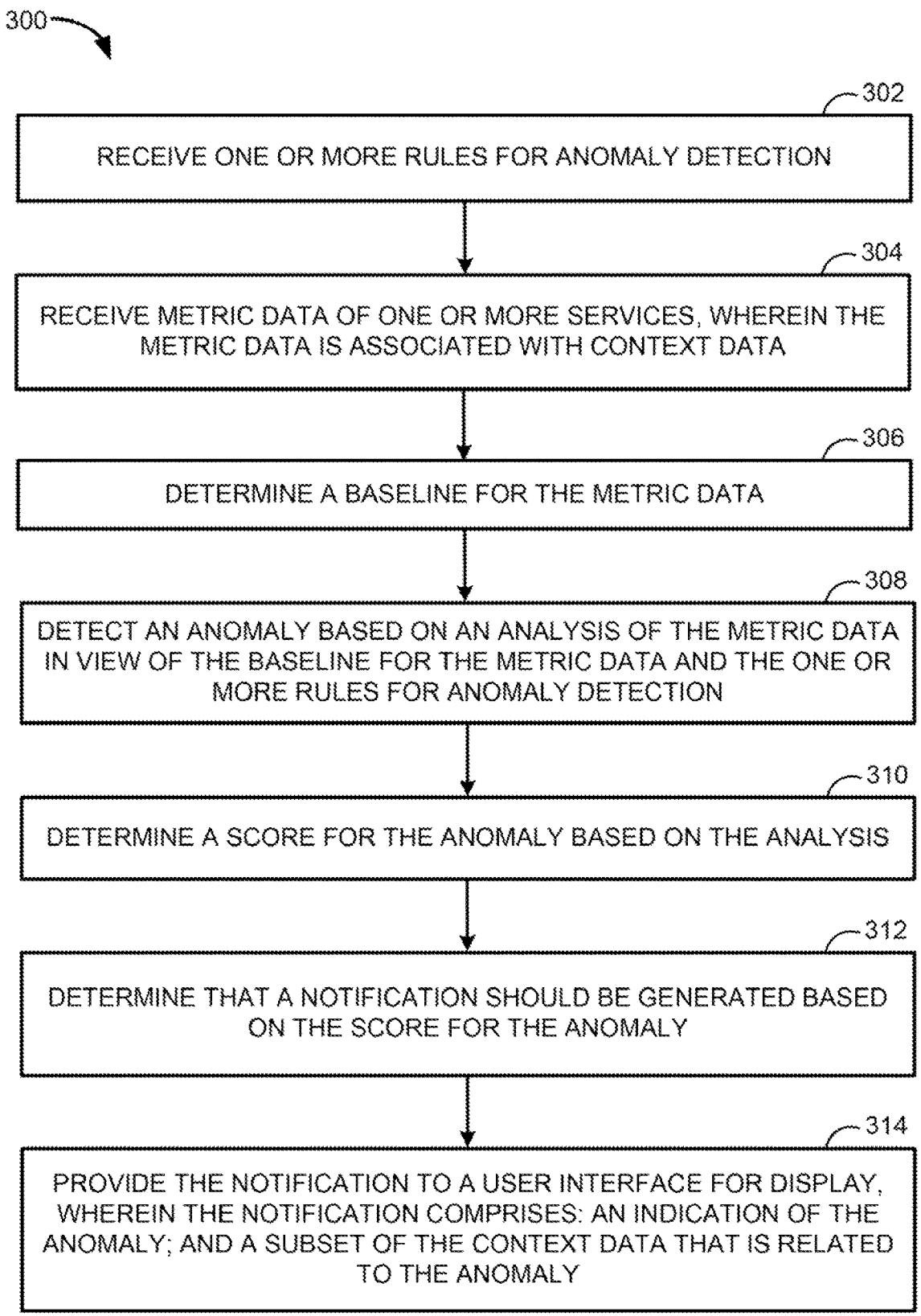
FIG. 3 depicts example operations for prescriptive analytics for network services.

FIG. 3 depicts example operations 300 for prescriptive analytics for network services. For example, operations 300 may be performed by data analytics engine 102 of FIG. 1.

Operations 300 begin at step 302, where one or more rules for anomaly detection are received. The rules may include learned parameters determined from offline processing of data. For example, the learned parameter may be an upper bound and/or lower bound for processor utilization for a given service. The learned parameter may have been determined using a machine learning model that has been trained using historical processor utilization data for one or more services. In other embodiments, the learned parameter was determined using statistical analysis of the historical processor utilization without using machine learning techniques.

At step 304, metric data of one or more services is received, wherein the metric data is associated with context data. In an example, the metric data may include processor utilization data for a service. The context data may be collected from one or more sources in the network, and may include, for example, topology information and metadata. In one example, the context data includes a device identifier of a device on which the service executes, a type of the device (e.g., VCI), an identifier of the service, a type of the service (e.g., content server), and/or information indicating relationships (e.g., connections) between the device and/or the service and one or more different devices and/or services. Metadata may include, for example, attributes such as a version of the service, a version of the operating system of the device on which the service is running, and/or the like.

At step 306, a baseline for the metric data is determined. The baseline may be determined through online processing of data and/or based on the rules for anomaly detection determined through offline processing. In on example, the baseline is determined by analyzing a first subset of the processor utilization data to determine an upper bound and/or lower bound (e.g., EUB and/or ELB as described above). In another embodiment, the baseline is determined from the rules for anomaly detection (e.g., an upper bound and/or lower bound determined using offline processing may be used as the baseline). In some embodiments, both the online and offline-determined parameters are used.

At step 308, an anomaly is detected based on an analysis of the metric data in view of the baseline for the metric data and the one or more rules for anomaly detection. For example, a given processor utilization value may exceed an upper bound and/or fall below a lower bound indicated by the baseline and/or the one or more rules for anomaly detection. A subset of the context data that is related to the anomaly may be associated with the anomaly. For example, the context data corresponding to one or more data points determined to be anomalous may be associated with the anomaly.

At step 310, a score for the anomaly is determined based on the analysis. The score may indicate an extent to which a given data points deviates from the baseline and/or fails to comply with other rules for anomaly detection. For example, an anomaly score for the anomaly may be determined as described above with respect to FIG. 1.

At step 312, it is determined that a notification should be generated based on the score for the anomaly. For example, if the score exceeds a threshold or meets another condition then a notification of the anomaly may be generated.

At step 314, the notification is provided to a user interface for display, wherein the notification comprises: an indication of the anomaly; and a subset of the context data that is related to the anomaly. In some embodiments, related anomalies are displayed together in the user interface.

Figure 4:
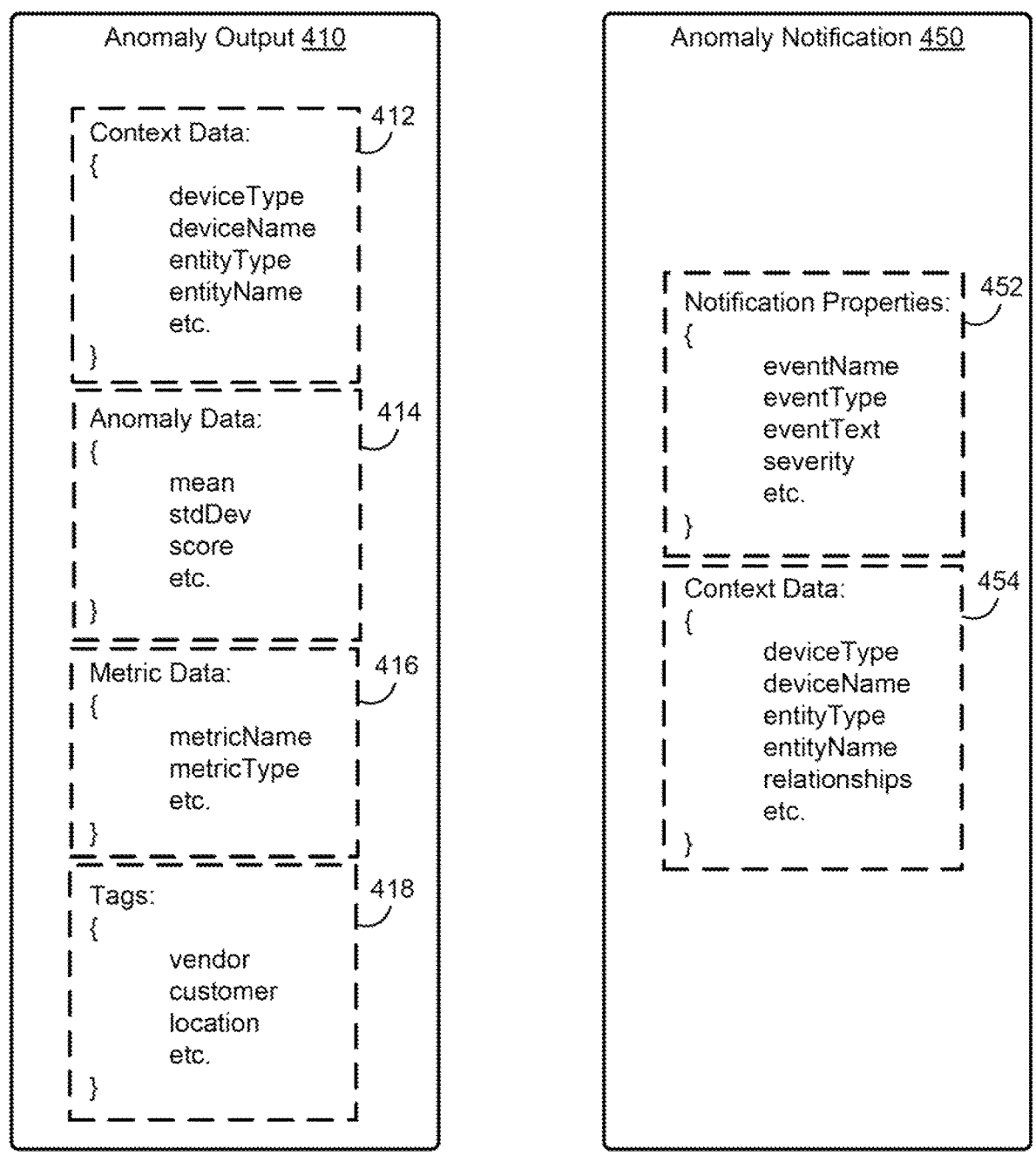
FIG. 4 depicts example data related to prescriptive analytics for network services.

FIG. 4 is an illustration 400 of example data related to prescriptive analytics for network services.

Anomaly output 410 may correspond to analysis output 136 of FIG. 1, and may represent an output of an anomaly detection process. Anomaly output 410 includes context data 412, which indicates a device type, a device name, an entity type (e.g., type of service to which the anomaly relates), an entity name, and other types of context information related to an anomaly. Anomaly output 410 further includes anomaly data 414, which includes information related to the detected anomaly such as the mean, standard deviation, anomaly score, and the like. Anomaly output 410 further includes metric data 416, which includes a metric name and metric type. Example of metrics include latency, throughput, numbers of connections, status, size, resource utilization, and the like. Anomaly output 410 further includes tags 418 indicating additional data related to the anomaly, such as a vendor, customer, location, and the like to which the anomalous data point relates. Tags 418 may be used in determining how to display a notification of the anomaly, and in determining which anomalies are related to one another.

An anomaly notification 450, generated based on anomaly output 410, includes notification properties 452. Notification properties 452 indicate an event name, an event type, event text, a severity (e.g., which may be based on the anomaly score), and the like. Anomaly notification 450 further includes context data 454, which includes the information from context data 412 as well as data derived from context data 412, such as relationships between the device and/or entity to which the anomaly relates and other devices and/or entities.

Figure 5:
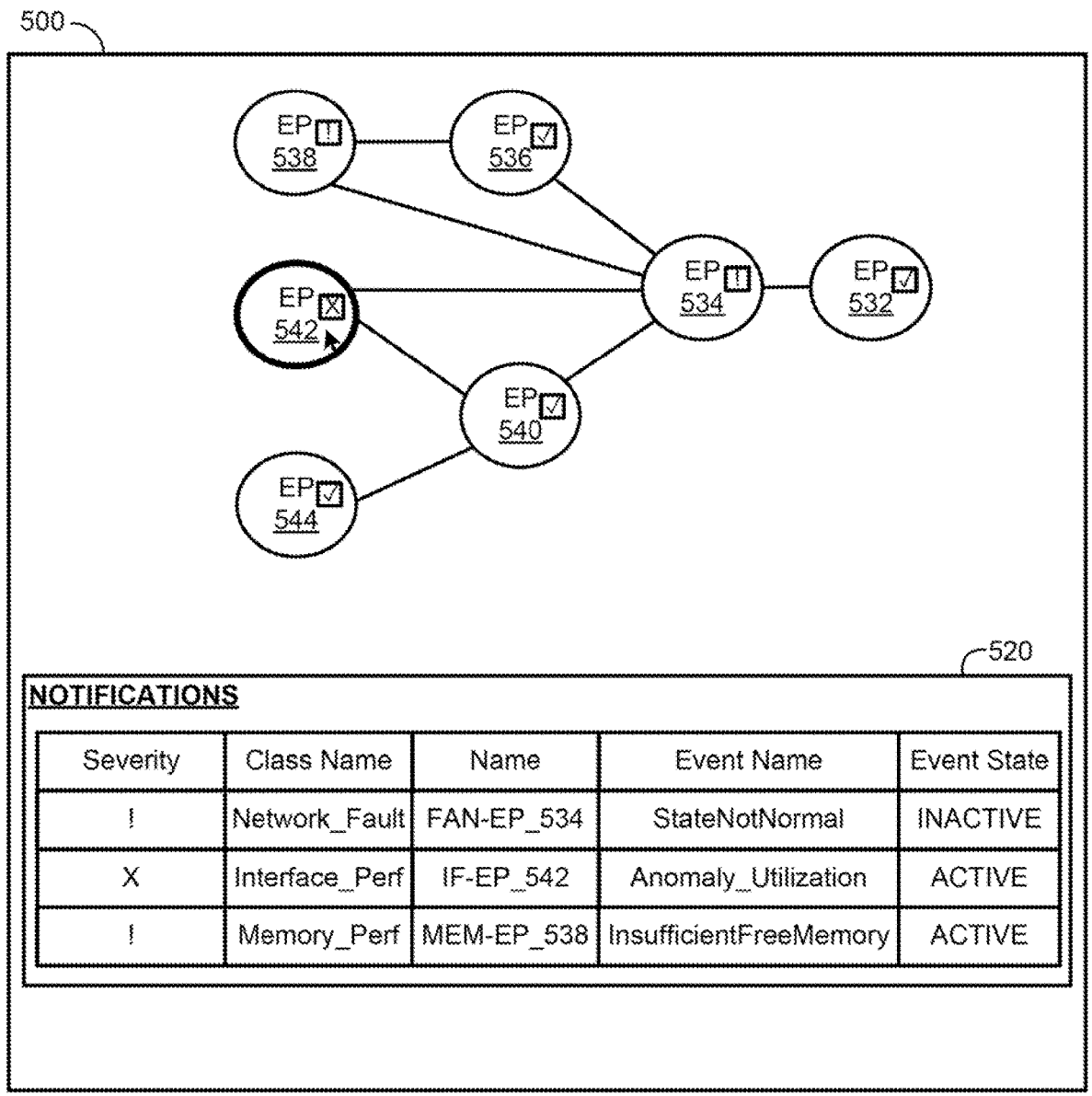
FIG. 5 depicts another example screen of a user interface for prescriptive analytics for network services.

FIG. 5 depicts an example screen 500 of a user interface for prescriptive analytics for network services. For example, screen 500 may be provided by user interface 110 of FIG. 1.

Screen 500 includes a topological representation of a plurality of network endpoints 532, 534, 536, 538, 540, 542, and 544, which may correspond to services and/or devices. Indicators within the representation of each endpoint display a state of the endpoint, such as whether the endpoint is in a normal state or has an anomaly of a certain severity. In the example shown in screen 500, endpoints 532, 536, 540, and 544 are in a normal state (indicated by a check mark), endpoints 534 and 538 have anomalies of a lower severity (indicated by an exclamation point), and endpoint 542 has an anomaly of a higher severity (indicated by an x).

Screen 500 may allow a user to select representations of endpoints to view notifications related to the endpoints, and/or may display notifications independently of user selections.

Panel 520 includes notifications of anomalies. For example, the three notifications shown in panel 520 may be for related anomalies (e.g., based on the anomalies corresponding to endpoints that are connected to one another). A first notification in panel 520 indicates a network fault that has occurred at endpoint 534, with a lower severity indicated by an exclamation point, an event name of "stateNotNormal", and an event state of "inactive" (e.g., indicating that the anomalous state is no longer present, such as because subsequent values have returned to a normal state). A second notification in panel 520 indicates an interface performance anomaly that has occurred at endpoint 542, with a higher severity indicated by an x, an event name of "Anomaly_Utilization" (e.g., indicating that a resource utilization value is anomalous), and an event state of "active" (e.g., indicating that the anomalous state is current). A third notification in panel 520 indicates a memory performance anomaly that has occurred at endpoint 538, with a lower severity indicated by an exclamation point, an event name of "InsufficientFreeMemory" (e.g., indicating that a memory utilization value has exceeded a threshold), and an event state of "active" (e.g., indicating that the anomalous state is current).

The user may be able to efficiently identify the source of anomalies based on the data displayed in screen 500. For instance, the user may determine that the anomaly at endpoints 542 and/or 538 are caused by the anomaly at endpoint 534 due to the topological relationships between these endpoints.

It is noted that screen 500 is included as an example, and many different types of user interfaces and notifications may be used to display indications of anomalies with associated context data as described herein.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of data analysis in a network, comprising:
receiving one or more rules for anomaly detection;
receiving metric data of one or more services;
collecting, from one or more sources in the network, context data related to the metric data, wherein the context data comprises:
topology information indicating a connection between a given service of the one or more services and a device or an additional service in the network; and
metadata indicating a software version or a capability related to the given service;

determining a baseline for the metric data;
detecting an anomaly with respect to the given service based on analysis of the metric data in view of the baseline for the metric data and the one or more rules for anomaly detection;
associating the anomaly with the context data;
determining a score for the anomaly based on the analysis;
determining that a notification should be generated based on the score for the anomaly; and
providing the notification to a user interface for display, wherein the notification comprises an indication of the anomaly and the context data, wherein a graphical depiction of the topology information is displayed via the user interface, and wherein displaying the notification comprises displaying the indication of the anomaly in proximity to a graphical element corresponding to the given service within the graphical depiction of the topology information.

2. The method of claim 1, wherein determining the baseline for the metric data comprises determining an upper bound and a lower bound based on a first subset of the metric data.

3. The method of claim 2, wherein detecting the anomaly based on the analysis of the metric data in view of the baseline for the metric data and the one or more rules for anomaly detection comprises comparing a value from the metric data that is subsequent to the first subset of the metric data to the upper bound and the lower bound.

4. The method of claim 1, wherein the one or more rules for anomaly detection are determined from an offline analysis of historical data related to the metric data.

5. The method of claim 1, wherein determining the score for the anomaly based on the analysis comprises determining an extent to which a given value from the metric data departs from the baseline.

6. The method of claim 5, wherein determining that the notification should be generated based on the score for the anomaly comprises determining that the score for the anomaly exceeds a threshold.

7. The method of claim 1, wherein the notification is displayed together with notifications of one or more related anomalies in the user interface.

8. A system for data analysis in a network, the system comprising:
  at least one memory; and
  at least one processor coupled to the at least one memory, the at least one processor and the at least one memory configured to:
    receive one or more rules for anomaly detection;
    receive metric data of one or more services;
    collect, from one or more sources in the network, context data related to the metric data, wherein the context data comprises:
      topology information indicating a connection between a given service of the one or more services and a device or an additional service in the network; and
      metadata indicating a software version or a capability related to the given service;
    determine a baseline for the metric data;
    detect an anomaly with respect to the given service based on analysis of the metric data in view of the baseline for the metric data and the one or more rules for anomaly detection;
    associate the anomaly with the context data;
    determine a score for the anomaly based on the analysis;
    determine that a notification should be generated based on the score for the anomaly; and
    provide the notification to a user interface for display, wherein the notification comprises an indication of the anomaly and the context data, wherein a graphical depiction of the topology information is displayed via the user interface, and wherein displaying the notification comprises displaying the indication of the anomaly in proximity to a graphical element corresponding to the given service within the graphical depiction of the topology information.

9. The system of claim 8, wherein determining the baseline for the metric data comprises determining an upper bound and a lower bound based on a first subset of the metric data.

10. The system of claim 9, wherein detecting the anomaly based on the analysis of the metric data in view of the baseline for the metric data and the one or more rules for anomaly detection comprises comparing a value from the metric data that is subsequent to the first subset of the metric data to the upper bound and the lower bound.

11. The system of claim 8, wherein the one or more rules for anomaly detection are determined from an offline analysis of historical data related to the metric data.

12. The system of claim 8, wherein determining the score for the anomaly based on the analysis comprises determining an extent to which a given value from the metric data departs from the baseline.

13. The system of claim 12, wherein determining that the notification should be generated based on the score for the anomaly comprises determining that the score for the anomaly exceeds a threshold.

14. The system of claim 8, wherein the notification is displayed together with notifications of one or more related anomalies in the user interface.

15. A non-transitory computer-readable medium storing instructions that, when executed by one or more processors, cause the one or more processors to:
  receive one or more rules for anomaly detection;
  receive metric data of one or more services;
  collect, from one or more sources in a network, context data related to the metric data, wherein the context data comprises:
    topology information indicating a connection between a given service of the one or more services and a device or an additional service in the network; and
    metadata indicating a software version or a capability related to the given service;
  determine a baseline for the metric data;
  detect an anomaly with respect to the given service based on analysis of the metric data in view of the baseline for the metric data and the one or more rules for anomaly detection;
  associate the anomaly with the context data;
  determine a score for the anomaly based on the analysis;
  determine that a notification should be generated based on the score for the anomaly; and
  provide the notification to a user interface for display, wherein the notification comprises an indication of the anomaly and the context data, wherein a graphical depiction of the topology information is displayed via the user interface, and wherein displaying the notification comprises displaying the indication of the anomaly in proximity to a graphical element corresponding to the given service within the graphical depiction of the topology information.

16. The non-transitory computer-readable medium of claim 15, wherein determining the baseline for the metric data comprises determining an upper bound and a lower bound based on a first subset of the metric data.

17. The non-transitory computer-readable medium of claim 16, wherein detecting the anomaly based on the analysis of the metric data in view of the baseline for the metric data and the one or more rules for anomaly detection comprises comparing a value from the metric data that is subsequent to the first subset of the metric data to the upper bound and the lower bound.

18. The non-transitory computer-readable medium of claim 15, wherein the one or more rules for anomaly detection are determined from an offline analysis of historical data related to the metric data.

* * * * *